(12) United States Patent
Chang

(10) Patent No.: US 6,775,734 B2
(45) Date of Patent: Aug. 10, 2004

(54) MEMORY ACCESS USING SYSTEM MANAGEMENT INTERRUPT AND ASSOCIATED COMPUTER SYSTEM

(75) Inventor: Kuo-Chi Chang, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 367 days.

(21) Appl. No.: 09/974,245

(22) Filed: Oct. 9, 2001

(65) Prior Publication Data

US 2003/0005247 A1 Jan. 2, 2003

(30) Foreign Application Priority Data

May 10, 2001 (TW) ........................................ 90111125 A

(51) Int. Cl.$^7$ ............................................ G06F 12/06
(52) U.S. Cl. ........................ 711/2; 711/163; 710/261; 712/229
(58) Field of Search ................... 711/2, 163; 710/260, 710/261; 712/229; 713/100

(56) References Cited

U.S. PATENT DOCUMENTS

| | | | | | |
|---|---|---|---|---|---|
| 5,978,903 | A | * | 11/1999 | Quimby et al. | ............. 712/229 |
| 5,987,604 | A | * | 11/1999 | Edrich | ............................. 713/1 |
| 6,145,048 | A | * | 11/2000 | Klein | ........................... 710/264 |
| 6,470,434 | B1 | * | 10/2002 | Beelitz | ....................... 711/173 |
| 6,615,288 | B1 | * | 9/2003 | Herzi | ........................... 710/10 |

* cited by examiner

Primary Examiner—Jack A. Lane
(74) Attorney, Agent, or Firm—J.C. Patents

(57) ABSTRACT

A method and computer system for accessing memory through a system management interrupt is disclosed. The computer system contains a CPU, a chipset and a memory unit. When the CPU receives a system management interrupt signal, the computer system enters a system management mode. In one embodiment, a software interrupt is invoked for achieving the purpose of accessing the memory space beyond 1 Mbytes. A system management interrupt signal is generated by the chipset while a software interrupt service routine associated with the software interrupt is running. The memory space beyond 1 Mbytes can therefore be accessed while the system management interrupt handler routine relative to the system management interrupt signal is running.

16 Claims, 3 Drawing Sheets

MEMORY ACCESS USING SYSTEM MANAGEMENT INTERRUPT AND ASSOCIATED COMPUTER SYSTEM

CROSS-REFERENCE TO RELATED APPLICATION

This application claims the priority benefit of Taiwan application serial no. 90111125, filed on May 10, 2001.

BACKGROUND OF THE INVENTION

1. Field of Invention

The present invention relates to a memory access technique. More particularly, the present invention relates to a method of accessing memory whose memory address is greater than 1 Mbytes in a personal computer system.

2. Description of Related Art

Most conventional personal computer system runs on Intel's 80×86 central processing unit (CPU). The 80×86 type of CPU is capable of operating under two different modes: the real mode and the protected mode.

A conventional computer system having the 80286 CPU has 20 address lines only and hence is able to address a memory space of up to 1 Mbytes. Intel's 80386 CPU has 32 address lines and hence is capable of addressing a memory space of up to 4 Gbytes. In real mode operation, however, the 80386 CPU has an effective bit width of 20 bits only. FIG. 1 is a schematic diagram showing the steps in a conventional method for accessing the memory space beyond the standard 1 Mbytes. As shown in FIG. 1, if the CPU currently operates under the real mode 100, the CPU needs to be switched into the protected mode 120 before accessing memory 140 at a location greater than the standard 1 Mbytes memory space.

Due to design limitations of a conventional CPU, accessing memory space beyond the 1 Mbytes range is impossible when operating in the real mode. In the past, accessing the memory space beyond the standard 1 Mbytes range required that the system enters the protected mode. However, a task cannot recognize that whether the CPU is currently in the protected mode or not. Therefore, to access memory beyond the 1 Mbytes memory space, the CPU must first be detected before executing associated procedures or steps necessary for bringing the CPU into the protected mode.

According to the aforementioned discussion, the conventional approach suggests a complicated way to access memory greater than or equal to 1 Mbytes because CPU has to enter the protected mode firstly. Furthermore, some tasks may be incapable of detecting the current operating mode of the CPU. Those tasks may bring the CPU into the protected mode again when the CPU is already in the protected mode.

SUMMARY OF THE INVENTION

Accordingly, one object of the present invention is to provide a memory access method using system management interrupt so that the memory space of a computer system beyond the standard 1 Mbytes can still be accessed without entering the protected mode.

To achieve these and other advantages and in accordance with the purpose of the invention, as embodied and broadly described herein, the invention provides a computer system using a memory access method that utilizes system management interrupt. The computer system includes at least a CPU. When the CPU receives a system management interrupt signal, the computer system starts operating in the system management mode and the CPU executes a system management interrupt handler routine. The method includes the following steps. First, a software interrupt is arisen for generating a system management interrupt signal. According to the system management interrupt signal, a system management interrupt handler routine is executed to access the data within the memory.

According to the memory access method of this invention, the computer system further includes a chipset. The system management interrupt signal is provided and accessed by a system management interrupt command port of the chipset. The software interrupt service routine and system management interrupt handler routine are provided by the basic input/output system (BIOS).

This invention also provides an alternative memory access method through the system management interrupt. This method includes the following steps. First, a software interrupt is produced if the addressed memory lies beyond 1 Mbytes. A system management interrupt signal is produced during the execution of the software interrupt service routine. Thereafter, the system management interrupt handler routine is executed so that the memory space above the 1 Mbytes can be accessed while the system management interrupt handler routine is running.

This invention also provides a computer system that utilizes system management interrupt to access memory. The computer system comprises a CPU, a chipset and a memory unit. The CPU is coupled to the chipset and the memory unit. When the CPU receives a system management interrupt signal, the computer system turns to operate in a system management mode. The chipset is used to arise the required system management interrupt signal. The computer system uses the aforementioned method to access the data residing in the memory unit addressed beyond 1 Mbytes.

This invention provides a software interface for bringing a CPU into a system management mode and the system management interrupt handler routine is executed. Hence, memory location beyond 1 Mbytes can be easily accessed without disadvantages of conventional approaches.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
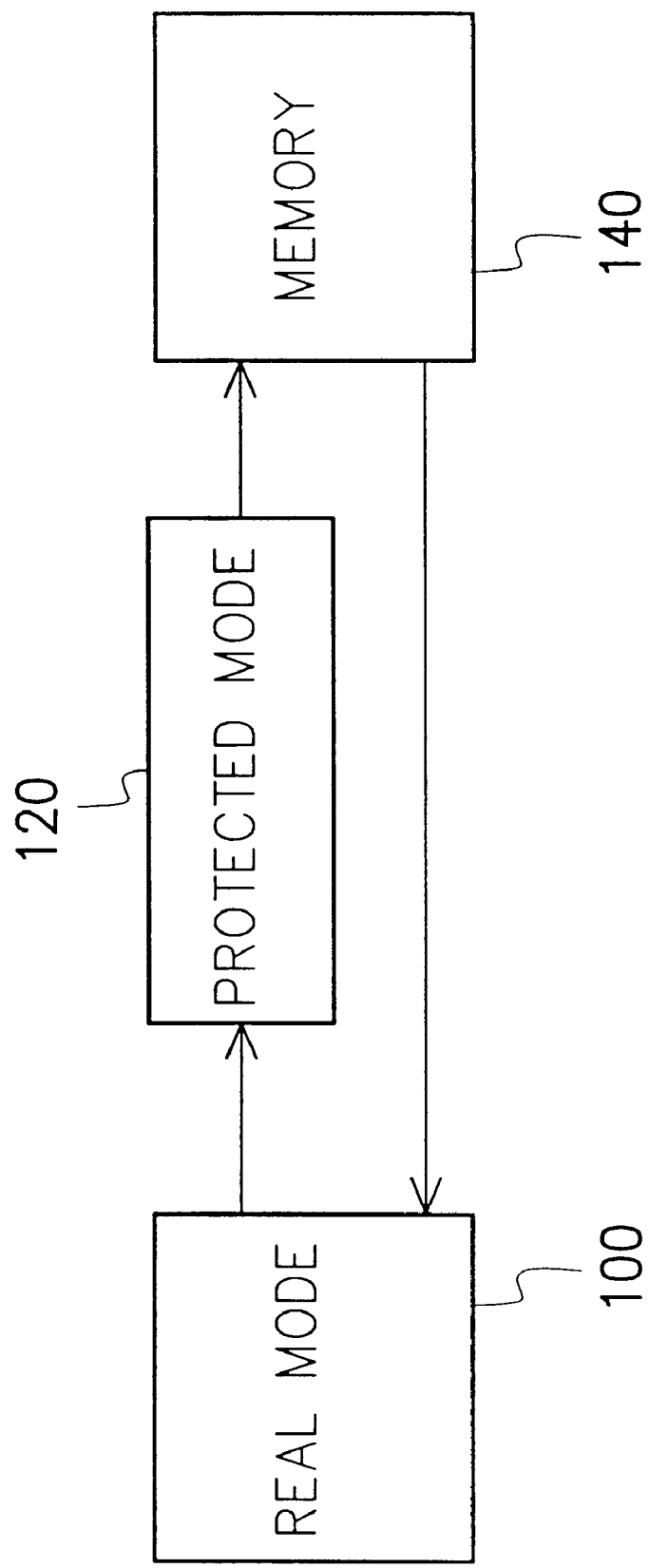
FIG. 1 is a schematic diagram showing the steps in a conventional method for accessing the memory space beyond the standard 1M.

Reference will now be made in detail to the present preferred embodiments of the invention, examples of which are illustrated in the accompanying drawings. Wherever possible, the same reference numbers are used in the drawings and the description to refer to the same or like parts.

System management mode (SMM) is a special function inside a central processing unit (CPU such as a Pentium processor) of most personal computers. The SMM provides system designers with a type of firmware such as basic input/output system (BIOS) to control the computer. The SMM has a certain degree of transparency to the operating system (OS). Major characteristics of SMM include:

1. The SMM has a system management interrupt (SMI) hardware interface and the associated chipset has an SMIOUT# pin. When the SMIOUT# pin of the chipset is enabled, the CPU proceeds into the SMM to execute the SMI handler routine provided by the BIOS. The SMI handler routine also has a 4Gbytes memory addressing capacity.
2. The SMM has dedicated and safe memory space normally referred to as system management random access memory (SMRAM). The memory space is an area for storing SMI handler routine codes and dumping state codes of CPU. Hence, in the SMM, a firmware or BIOS handler is able to obtain the content inside CPU register, such as EAX and EBX, when SMI occurs.
3. The SMM also has system management mode base (SMBase) addresses as well as default addresses. Moreover, these addresses can be reset. Furthermore, in a multiple processor (MP) system, different CPU has its own special SMBases.
4. A resume (RSM) instruction can be used to leave SMM so that CPU can execute the program code immediately following the SMI.

The BIOS is able to actuate a number of SMI handler routines under SMM to support other functions not supported or fully supported by the operating system (OS), for example:

1. USB devices, e.g., keyboards, mouse and so on may be supported. In general, operating systems such as OS DOS and NT 4.0 that do not contain USB driver programs to drive a USB device and controller. Therefore, the chipset in cooperation with the BIOS may provide SMI hardware interrupt interface and associated handler to capture information from the output ports (port 60h and port 64h) of a conventional keyboard controller (for example, 8042) and to simulate functions of the USB device and controller. In other words, under OS DOS and NT 4.0, a USB device can still be used even without a USB driver program.
2. Advanced power management (APM) device is supported. The BIOS provides INT 15 and relative software to the operating system for managing a power source. Hence, a power-saving mode can be performed.
3. Motherboard main functions are supported. Motherboard designers who design special functions often use the SMI handler routine to achieve their desires.

Because the system management mode (SMM) has the aforementioned characteristics, a computer system that utilizes the system management interrupt to access memory can be implemented.

Figure 2:
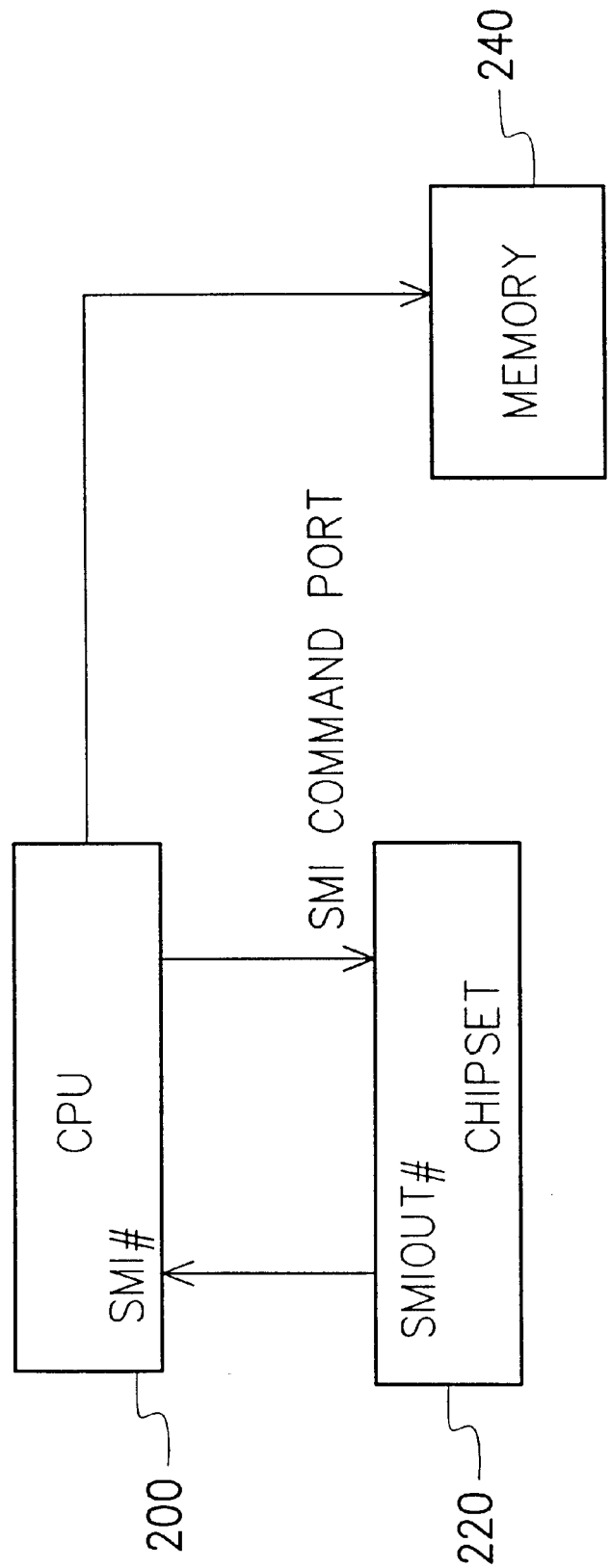
FIG. 2 is a schematic diagram showing a computer system according to one preferred embodiment of this invention.

FIG. 2 is a schematic diagram showing a computer system according to one preferred embodiment of this invention. As shown in FIG. 2, the computer system includes a CPU 200, a chipset 220 and a memory unit 240. The CPU 200 is coupled to the chipset 220. The chipset 220 has a SMIOUT# pin that connects with a corresponding SMI pin in the CPU 200. When the CPU 200 receives a system management interrupt signal (that is, an enable signal from the SMIOUT# pin of the chipset) from the chipset 220, the CPU 200 proceeds into the SMM and then actuates a SMI handler routine. The memory unit 240 is coupled to the CPU 200 for receiving and holding data.

This invention provides a software interrupt interface in the BIOS. The software interrupt interface is capable of sending a command to the SMI command port so that the chipset 220 can enable the SMIOUT# pin and trigger the CPU 200 into the SMM.

Figure 3:
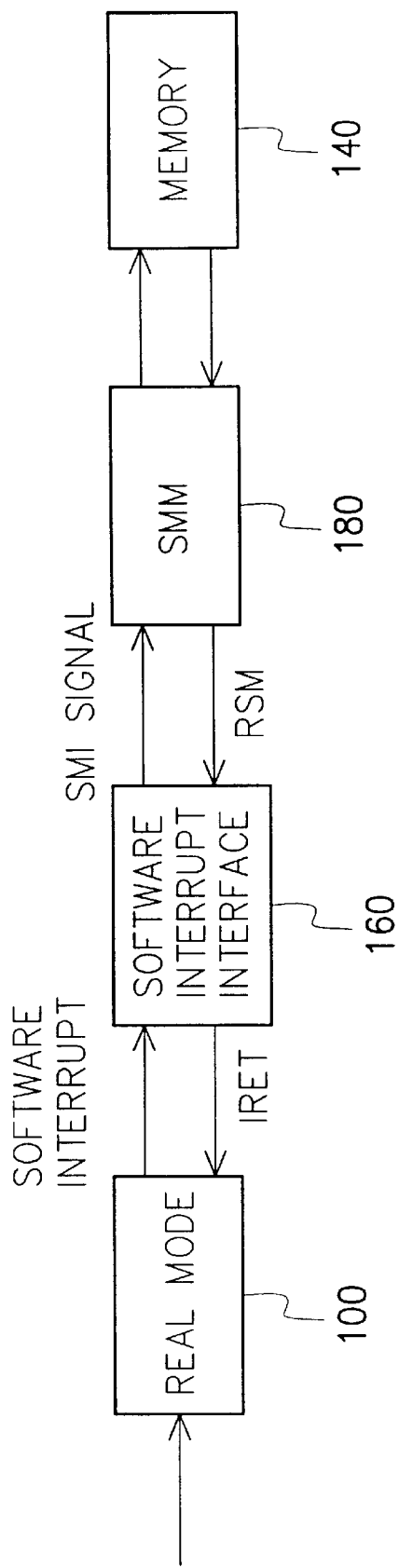
FIG. 3 is a schematic diagram showing the steps for accessing memory data using system management interrupt according to one preferred embodiment of this invention.

FIG. 3 is a schematic diagram showing the steps for accessing memory data using system management interrupt according to one preferred embodiment of this invention. As shown in FIG. 3, to access memory data with an address beyond 1 Mbytes while the CPU is in the real mode 100, the computer system invokes a software interrupt. According to this embodiment, a software interrupt service routine provided by the interrupt vector int 15h is used as a software interrupt interface 160. A command is transmitted from the software interrupt interface 160 to the SMI command port so that the chipset can arise a system management interrupt (SMI) signal (an enable signal from the SMIOUT# pin) triggering the CPU into the SMM 180. In the SMM 180, the SMI handler routine is able to access the memory space whose addressing range beyond than 1 Mbytes. After a data access operation, a resume (RSM) instruction is arisen for jumping back to the software interrupt interface 160. Thereafter, the software interrupt interface 160 utilizes an interrupt return (IRET) instruction to return the CPU into the real mode 100.

The following is a description of the steps for implementing the aforementioned memory access method through system management interrupt.

To read the data from memory address E8000120H, the following program is used:

```
mov     edi, 0E8000000h;
mov     ebx, 120h;
mov     ah, 0A1h;
mov     al, 88h;
int     15h;
mov     eax, ecx
```

In the above program, the value stored inside the registers edi and ebx are actual memory addresses. The value 0A1h stored inside the register ah serves to inform the software interrupt interface and issue a SMI. The value 88h stored inside register al indicates a data read operation. The int 15h command initiates an interrupt operation. At the end of the interrupt operation, the value stored inside the register eax is the data retrieved from the memory address E8000120H.

To write 000055AAH to the memory unit with an address E8000120H, the following program is suggested:

```
mov     edi, 0E8000000h;
mov     ebx, 120h;
mov     ecx, 000055Aah;
mov     ah, 0A1h;
mov     al, 89h;
int     15h
```

Similarly, the value of the registers edi and ebx are actual memory addresses. The register ecx stores the data to be written into the memory. The value 0A1h stored inside the register ah serves to inform the software interrupt interface and issue a SMI. The value 89h stored inside register al indicates a data write operation. The int 15h command initiates an interrupt operation. At the end of the interrupt operation, the value stored inside the register ecx is written to the memory address E8000120H.

Furthermore, when the CPU is executing the software interrupt (int 15h) service routine within the BIOS, the software interrupt interface 160 access an SMI command port so that the chipset produces a system management interrupt signal (the SMIOUT# pin of the chipset is enabled). The chipset may generate a system management interrupt signal according to the following program, for example:

```
INT_15h_Service        Proc    far
                       .
                       .
                       .
                       cmp     ab, 0a1h;
                       jne     Not_Issue_SMI;
                       jmp     INT_Issue_SMI;
Not_Issue_SMI:
                       .
                       .
                       .
INT_15h_ServiceEndp
```

In the above interrupt service routine, the stored value inside the register a1 is compared with the value 0A1h. The chipset generates the system management interrupt signal (INT15_Issue_SMI) when there is a match.

```
INI15_Issue_SMI        Proc    far
                       Cmp     al, 00h;
                       Jc      Succ_Exit;
                       Push    dx;
                       Mov     dx, ACPI_PORT + 2Fh;
                       Out     dx, al;
NEWIODELAY
NEWIODELAY
                       Pop     dx;
Succ_Exit:
                       Clc;
                       Retf    2;
INT15_Issue_SMI        Endp
```

In the above program provided by a chipset, the value stored inside the register al is first checked to determine whether to enters into the SMM or not. The SMI command port address (ACPI$_{13}$ PORT+2Fh) is put to dx. When the Out dx, al instruction is executed, the system management interrupt signal (INT15_Issue_SMI) is produced by the chipset. Note that the values of all the registers in the CPU are put into the state dump area of the memory during the SMM. The write-in locations of the data are described in supplementary document 1. In other words, the value inside the register (ecx), which is designed to hold write-in data, is stored inside the state dump area during a write-in operation.

When the CPU receives the system management interrupt signal, the CPU 100 proceeds into the SMM 180 and executes a corresponding system management interrupt (SMI) handler routine to access the memory space greater than 1 Mbytes in the memory unit 140. The SMI handler routine for carrying out actual data access can be explained using an example as follows:

```
READ_OHCI_REG EQU 88h;
WRITE_OHCI_REG EQU 89h;
SW_SMI_For_Memory        Proc     Near
        Pushad;
        Push    ds;
        Mov     dx, ACPI_PORT + 2Fh;
        In      al, dx;
        Cmp     al, READ_OHCI_REG;
        Je      Is_1394_SMI;
        Cmp     al, WRITE_OHCI_REG;
        Je      Is_1394_SMI;
        Jmp     1394_SMI_Exit
```

In the above program, the value in register al is first checked to determine if the value is 88h (read) or 89h (write) and then a read/write operation (Is_1394_SMI) is conducted. The read/write operation is executed according to the following program:

```
Is_1394_SMI:
        Push    ax;
        Xor     ax, ax;
        Mov     ds, ax;
        Mov     si, 7FECh;
        Mov     edi, dword ptr cs:[si];
        Mov     si, 7FDCh;
        Mov     ebx, dword ptr cs:[si];
        Mov     si, 7FD4h;
        Mov     ecx, dword ptr cs:[si];
        Pop     ax;
        Cmp     al, READ_OHCI_REG;
        Jne     WRITE_OHCI;
Read_OHCI:
        Mov     si, 7FD4h;
        Mov     eax, dword ptr ds:[edi + ebx];
        Mov     dword prt  cs:[si], eax
        Jmp     1394_SMI Exit;
Write_OHCL:
        Mov     dword prt  ds:[edi + ebx], ecx;
1394_SMI Exit;
        Pop     ds;
        Pop     ad;
        Ret
SW_SMI_For_Memory        Endp
```

Before conducting any read or write operation, a memory address must be fetched. Hence, the program looks for an actual memory address (7FECH and 7FDCH in supplementary document 1) in the stage dump area and transfer the address to the registers edi and ebx. Similarly, the value 7FD4H is also fetched and transferred to the register ecx.

The value inside the register al is fetched and compared to determine if a read or a write operation is required. In a write operation, the value inside the register ecx is written into memory location indicated by the actual address (inside edi and ebx). In a read operation, however, data within the designated address is transferred into the register eax before moving the data into the location (7FD4H) within the state dump area where ecx data are held.

At the end of the SMI handler routine, control right is returned to the software interrupt (int 15h) service routine and a full set of data within the state dump area is transferred back to the CPU. Hence, at the end of software interrupt (int 15h), data within the ecx register stores the actual memory data required for a read operation and data within the ecx register holds data that can be written into the memory for a write operation.

Note that the aforementioned embodiment illustrates the method for accessing double word information form memory. However, the concept can be extended to the application of accessing whole a block of memory at a time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

Supplementary Document 1

| Offset (Added to SMBASE + 8000 H) | Register | Writable |
|---|---|---|
| 7FFCH | CR0 | No |
| 7FF8H | RC3 | No |
| 7FF4H | EFLAGSCR0 | Yes |
| 7FF0H | EIP | Yes |
| 7FECH | EDI | Yes |
| 7FE8H | ESI | Yes |
| 7FE4H | EBP | Yes |
| 7FE0H | ESP | Yes |
| 7FDCH | EBX | Yes |
| 7FD8H | EDX | Yes |
| 7FD4H | ECX | Yes |
| 7FD0H | EAX | Yes |
| 7FCCH | DR6 | No |
| 7FC8H | ER7 | No |
| 7FC4H | TR* | No |
| 7FC0H | LDTBase* | No |
| 7FBCH | GS* | No |
| 7FB8H | FS* | No |
| 7FB4H | DS* | No |
| 7FB0H | SS* | No |
| 7FACH | CS8 | No |
| 7FA8H | ES* | No |
| 7FA7H-7F04H | Reserved | No |
| 7F02H | Auto HALT Restart Field (Word) | Yes |
| 7F00H | SMM Revision Identifier Field (Double Word) | No |
| 7EF8H | SMBASE Field (Double Word) | Yes |
| 7EF7H-7E00H | Reserved | No |

What is claimed is:

1. A memory access method for a computer system, a memory unit of said computer system having a first addressing range and a second addressing range wherein said second addressing range is beyond a pre-determined threshold, said computer system accessing said first addressing range under a first operating mode and accesses said second addressing range under a second operating mode, said method comprising:

invoking a software interrupt to arise a system management interrupt signal while said computer system has to access said memory unit in said second addressing range; and while receiving said system management interrupt signal, executing a system management interrupt handler routine for accessing said memory unit from said second addressing range under a system management mode, and keeping in said system management mode during executing said system management interrupt handler routine instead of entering said second operating mode.

2. The memory access method of claim 1, wherein said computer system includes a chipset for arising said system management interrupt signal according to a software interrupt invoked from a central processing unit (CPU) of said computer system.

3. The memory access method of claim 2, wherein a software interrupt service routine provided by a basic input/output system (BIOS) unit of said computer system is responsive to said software interrupt to actuate said chipset for arising said system management interrupt signal.

4. The memory access method of claim 2, wherein said CPU operates in said first operating mode while invoking said software interrupt.

5. The memory access method of claim 4, wherein said first operating mode is a real mode of said computer system and said second operating mode is a protected mode of said computer system.

6. The memory access method of claim 1, wherein said second addressing range is a memory space beyond 1 Mbytes.

7. The memory access method of claim 1, wherein said system management mode comprises an interrupt return for returning said computer system back to said first operating mode.

8. A memory access method for a computer system that runs in a protected mode and a real mode, a memory unit of said computer system having a first addressing range and a second addressing range wherein said second addressing range is beyond a pre-determined threshold, said computer system accessing said first addressing range under said real mode and accesses said second addressing range under said protected mode, said method comprising:

invoking a software interrupt by a central processing unit (CPU) of said computer system while said computer system accesses said memory unit in said second addressing range, wherein said CPU currently operates under said real mode;

arising a system management interrupt signal according to said software interrupt; and while receiving said system management interrupt signal, executing a system management interrupt handler routine for accessing said memory unit in said second addressing range under a system management mode, and keeping in said system management mode while said system management interrupt handler routine executing instead of entering said protected mode.

9. The memory access method of claim 8, wherein said computer system includes a chipset for arising said system management interrupt signal.

10. The memory access method of claim 9, wherein a software interrupt service routine provided by a basic input/output system (BIOS) unit of said computer system is responsive to said software interrupt to actuate said chipset for arising said system management interrupt signal.

11. The memory access method of claim 8, wherein said second addressing range is a memory space beyond 1 Mbytes.

12. The memory access method of claim 8, wherein said system management mode comprises an interrupt return for returning said CPU back to operate in said real mode.

13. A computer system capable of running in a real mode and a protected mode comprising:

a chipset for arising a system management interrupt signal;

a memory unit having memory spaces being separated into a first addressing range and a second addressing range, wherein said second addressing range is beyond a pre-determined threshold, said first addressing range being accessed under said real mode and said second addressing range being accessed under said protected mode; and a center processing unit (CPU) coupled to said memory unit and said chipset for entering a system management mode while receiving said system management interrupt signal, for executing a system management interrupt handler routine after entering said system management mode, and for accessing said memory unit under said system management mode, wherein when said CPU has to access said memory unit within said second addressing range and said CPU currently operates in said real mode, said CPU invokes a software interrupt to execute a system management interrupt handler routine so that said chipset can generate said system management interrupt signal to make said CPU to access said memory unit in said second addressing range under a system management mode and during executing said system management interrupt handler routine, said CPU keeps in said system management mode instead of entering said protected mode.

14. The computer system of claim 13, wherein said software interrupt is sent from said CPU to a system management interrupt command port of said chipset to arise said system management interrupt signal.

15. The computer system of claim 13, wherein said memory unit of said second addressing range being accessed while said CPU is still executing said system management interrupt handler routine.

16. The computer system method of claim 13, wherein a software interrupt service routine provided by a basic input/output system (BIOS) unit of said computer system is responsive to said software interrupt to actuate said chipset for arising said system management interrupt signal.

* * * * *